Patented July 28, 1936

2,048,807

UNITED STATES PATENT OFFICE 2,048,807

COMPOSITE RUBBER SHEET

Albert L. Murray, Auburn, Ind.

No Drawing. Application December 9, 1933, Serial No. 701,661

6 Claims. (Cl. 18—59)

My invention relates to improvements in composite rubber sheets and to articles manufactured therefrom, such as shoe soles and heels.

My invention is an improvement upon the inventions disclosed in my prior Patents No. 1,577,349 and No. 1,624,500, and more particularly the latter.

My present invention relates to the generic idea of more perfectly associating stock suitable for tread purposes with stock suitable for backing purposes and in the form of layers, sheets, films, or the like, by the use of a retardant material and the addition of toughening material, or materials, the latter being incorporated in the backing stock. These toughening materials have the secondary property of carrying or catalyzing the vulcanizing agent, or agents, in the adjacent tread stock to the other or backing stock, which is not to be vulcanized, thereby causing a vulcanizing effect in the backing stock, which unless controlled, will destroy the necessary tacky or cement receptive condition of the exposed surface of the backing stock. This controlled condition, however, is brought about by the use of retardant material described in this invention.

This retardant material permits the plural layer, comprised of sheets or films, to be simultaneously handled; that is, subjected to pressure and heat without the migration to that degree of the vulcanizing material from the tread stock into the backing stock which would secure partial vulcanization of the backing stock sufficient to destroy that non-vulcanized condition of the exposed face of the backing strip, which non-vulcanizing tacky condition of said face is that it must be susceptible to the action of the solvent of the rubber cement to form a homogeneous union with the rubber included in that cement and the rubber face of the backing strip, whereby the composite sheet including the tread stock, can be properly secured to a supporting surface, to which rubber cement also has been applied.

One form of the invention includes the idea of incorporating the retardant as a film, or the like, between the backing layer and the tread layer, or the layer to be cured and by applying the film to either or both surfaces of said layers, which are placed in contact for subsequent treatment as subjection to heat and pressure.

Another form of the invention contemplates the incorporation of the retardant in either of the aforesaid layers, although preferably it is incorporated in the backing layer so that larger amounts of vulcanizing agents and/or toughening materials can be used in the backing than would be possible without the retardant within the bounds of maintaining the exposed portion of the backing material in a tacky or cement receptive condition.

By the statement made that the retardant prevents vulcanization of the backing layer, I do not mean to infer that "under vulcanization" or "slight vulcanization" does not occur therein. The latter may take place and yet the backing strip be of a substantially raw or non-vulcanized condition so far as its exposed face is concerned.

During the years subsequent to the filing of my applications, resulting in the aforesaid patents, experience has determined that while shoe soles and the like made under these patents are satisfactory in use for most purposes, yet such shoe soles when subjected to the extra hard conditions, such as use under extreme heat conditions of the tropics or in foundries and other unusual hot conditions, and also to some extent under the extra hard use by children of growing age, would be improved by a toughening of the backing material.

The present invention, therefore, is directed to increasing the life and holding power of the resultant sole, so that it is equally suitable for extra hard wear and/or use under extra hot conditions, as the soles manufactured under the aforesaid Letters Patent are suitable for ordinary wear under normal conditions. I have determined that the adhesive between the leather sole and the rubber sole, as an entirety, by reason of the rubber cement, is satisfactory for all types of wear.

I have also determined that the tread stock may be manufactured under various formulas well known in the art, and will stand up under normal and abnormal wear. I have ascertained the weak point under abnormal wear or extremely hard conditions, is in the backing layer.

Attempts heretofore made to incorporate in the backing material a toughening agent, have not been successful. The incorporation of minor amounts of certain toughening agents such as zinc, magnesia, oxide of iron, or others of a similar character, with the raw rubber or backing layer of Patent No. 1,624,500, I have found resulted in but minor toughening said raw rubber and practically insufficient for the result desired. I have found that when used in any amount estimated to be sufficient to bring about any noticeable or practical toughening such amounts introduce the objectionable features of weakening the raw rubber's strength and imparting a granular character thereto if there is no vulcanizing action within the rubber backing. Such granular character has, under that condition, the property that it reduces the size and strength of the legs or films of rubber in the backing layer when it is attempted to pull said layer apart. Thus, toughening agents per se permit the rubber in the backing layer, by reason of the granularity imparted thereto, to tear more easily than if these toughening materials were left out.

By "toughening" is, therefore, meant the increase in elasticity of rubber in the non-vulcanized or partly vulcanized layer and more particularly its increased resistance to a complete rupture when subjected to tension, and by "weakening" is meant the opposite effect.

I have also found that such toughening materials act as carriers of the vulcanizing agents in the tread stock and cause the vulcanizing materials to migrate rapidly into and through the comparatively thin and raw rubber backing stock with the result that a higher degree of vulcanization takes place throughout the backing strip which degree of vulcanization is detrimental or dangerously inclined to be detrimental to the maintenance of that tacky or cement receptive condition desired of the exposed portion of the backing layer because with the uncertain and increased degree of vulcanization caused by migration of the curing agents in the tread layer into the backing layer, there is always the strong probability that after the finished sole leaves the factory and before it is applied to the leather shoe sole by the ultimate purchaser, there forms a bloom or oxidation on the outer surface of the backing layer which is sufficient to prevent the rubber cement from partly dissolving the face or outer portion of the backing layer necessary to secure the desired strength in the cement union. The bloom or irregular degree of vulcanization comes about through the fact that in producing the tread rubber portion of the sole, the first necessity is to obtain the best possible degree of vulcanization with the varied materials which it is customary to use, often including a considerable part of reclaim rubber. To produce durability in this desired tread, it is common practice to continually make changes in the kinds and quantities of accelerators used, and since different accelerators have different migrating properties, it becomes practically impossible to produce and retain the desired and necessary tacky or cement receptive condition of the backing ply exposed surface unless there is some method of controlling the migration of curing effect from the tread ply and thus leaving the degree of vulcanization or of toughening or both, a predetermined proposition and one that can be maintained irrespective of changes in the curing agents of the tread portion.

I have also found that such materials as rosin, which normally are harder in their individual form than raw rubber, yet when mixed with raw rubber, have a weakening effect on the rubber legs of the backing layer and thus do not increase the tearing resistance of said layer to a suitable force attempting to tear that layer apart. Partial vulcanization of the raw rubber backing, it has been determined, will increase its tearing strength, yet partial vulcanization must be kept down to an extremely small percent, because in addition to the danger of losing the necessary tacky or cement-receptive condition of the exposed surface, if the raw rubber layer is vulcanized to such a degree that it becomes harder than the film of rubber cement subsequently applied thereto and to the leather shoe sole, then the flexing strain between the rubber sole and the leather sole of the shoe is first applied and will usually be localized in the cement union and by reason of the imperfect connection or uniting of the raw rubber deposited by the cement and any distinctly harder surface of the backing layer, there results a tearing or separation at this point. In fact, unless the partial vulcanization, as before stated, is controlled and kept down to an extremely small percent in the so-called raw rubber layer, the connection between the composite sheet and its support (the leather shoe sole) will break down at the point where the raw rubber is deposited by the rubber cement and is associated with the face of the composite rubber sheet. Partial vulcanization, also, has that inherent action of destroying the tacky condition of the face of the backing strip and this is evidence that the face of the backing strip is not in that desired tacky condition to permit the formation of the perfect union necessary between the raw rubber deposited by the cement and the backing strip.

If there is incorporated in the backing strip the tougheners, certain of them have the property of migrating to the exposed face and forming a film or tough surface, commonly known as a bloom, which is resistant to the perfect union necessary to be formed with the raw rubber deposited by the rubber cement between it and the exposed layer.

There is also the inclination of the sulphur included in the thread stock to migrate into the backing stock and form a bloom on the exposed face thereof and this is accelerated by the inclusion of an extremely small percentage of a curing agent, such as sulphur, in the backing strip.

The present invention, therefore, is directed to the prevention of the migration of the curing agent in and necessary for curing the tread stock from migrating from the tread stock to and/or through the backing strip which, when thus prevented, permits the inclusion of toughening materials and/or of curing agents having the effect of toughening in the backing strip. This is the desirable objective because if the surface of the backing strip can be maintained tacky and/or otherwise free from a deleterious film or surface, then the desired perfect connection between the raw rubber deposited by the rubber cement and the backing strip can be effected. Since the backing stock and the tread stock are united together by heat and pressure simultaneously applied in the usual practice and since this is of such a character that failure or separation between the two is practically unknown, then in view of the experiments which have determined that the weakest point in the entire structure is in the backing strip itself, it is quite apparent that the toughening thereof is highly desirable.

To obtain this toughening result in the backing strip without destroying the effectiveness of the exposed surface of the backing strip is the problem. The solution has been found. It is the use of a retardant and usually it is positioned between the two strips which prevents the normal migration of the curing agents into the backing strip and which also prevents the accelerated migration of said curing agents into the backing strip by reason of the fact that when the backing strip is toughened, the toughening agents do not act as catalyzers or carriers of the curing agent, or agents, in the tread stock into and/or through the backing strip.

It has been determined that previous to associating the two layers together, the faces of said layers that are to be placed side by side or one upon the other, may have applied to either an adjacent face or adjacent faces thereof a thin film or coating of raw rubber free from curing agents or carriers, oils, glycerine, glue, or any of the retardant acids such as benzoic, maleic, pthalic, paratoluenesulfonic, or any other material having the property of holding back or retaining within the tread stock the vulcanizing or curing agents thereof, so that the latter does not migrate into the backing layer or such migration is sufficiently retarded such that on the exposed face of the backing layer there is not formed a deleterious film nor is the backing layer vulcanized to that degree that there would result an imperfect cement union when the composite stock is applied to a support through the medium of a rubber cement.

The use of this retardant material furthermore has the property of permitting the incorporation in the raw rubber stock, of certain toughening materials which will impart to the raw rubber stock a toughening effect, yet the amount or character thereof, it is to be understood, is such a character that it will not form a bloom or deleterious film itself on the exposed face of the backing strip or result in a granulated layer.

By exposed face of the backing strip is meant that face which is normally covered by a protective element commonly known as "holland", or the like, which usually is calendered cloth or paper, the same being secured to the backing strip exposed face usually simultaneously with the vulcanization of the tread stock and the permanent uniting of the tread stock to the backing stock and the die formation of the composite sheet into the form of soles or the like.

The ultimate purchaser before applying the sole to the shoe, removes the "holland" from the sole and exposes the tacky face, which is then cement coated before it is presented to the shoe to which also has been applied the rubber cement. The rubber sole is applied to the shoe when the rubber cement becomes tacky, that is, when the majority of the solvent in the cement has evaporated. The remaining solvent in the cement that remains on the shoe and on the sole, is sufficient to cause the cemented surfaces of the sole and the shoe to become homogeneously united.

While herein there has been disclosed the use of a retardant applied as a film interposed between the two stocks, as initially set forth the retardant may be any other material or materials, than those mentioned specifically, and may be incorporated in the tread stock or may be incorporated in the backing stock, or may be included in both. If the material, or materials, incorporated in the backing layer have a slight curing or vulcanizing effect, then the amount used must be less than enough to produce a loss of the necessary tacky or cement receptive condition of the exposed surface of the backing strip, and also must be less than enough to produce sufficient hardening or stiffness throughout the backing stock as would cause this backing stock to separate as a unit from the cement applied to it under the flexing of the shoe in use. The problem set forth and the solution set forth will be apparent by referring to the following, quoted from my Patent No. 1,624,500.

"By 'raw rubber' or 'unvulcanizable' is to be understood the coagulated latex of a rubber producing plant, having neither a vulcanization admixture nor an admixture of any substance which, upon the raw rubber being placed in contact, with a vulcanization element such as sulphur, will act to cause the vulcanization element to pass into or impregnate the raw rubber.

"Raw rubber, as here meant, is understood to have neither an active vulcanizing agent such as sulphur nor to have a passive or catalyzing agent such as zinc mixed therewith. It is not, however, intended that the term, as used herein, is to mean chemically pure coagulated latex, but simply to describe a coagulated latex, which may be mixed with substances inert as far as vulcanization is concerned, but is free from any substance tending to assist in the vulcanizing process."

In brief, the invention produces a stronger backing strip, that is, one which has a greater resistance to tear; second, the vulcanization union between the backing and tread layers is reduced as to depth, the retardant offering sufficient resistance to complete migration of the curing agent or agents, from the tread to and through the backing strip, thereby preventing vulcanization of the latter to a deleterious degree and/or formation of a deleterious exposed face on the backing strip, although such retardant does not prevent the necessary vulcanization between the two strips so that the resultant union of the rubber strips is fully sufficient to resist tearing and so that particular union does not constitute the weakest link in use nor is it necessary that the retardant absolutely prevent any vulcanization of the backing strip.

It is to be understood that certain tougheners have the property of curing or constituting vulcanizing agents. A small amount thereof will have but little effect on the backing rubber to cure the same when incorporated therein, but will have a relatively great toughening or strengthening effect. These materials, as before stated, have the property of acting as carriers for other curing agents; hence, the migration of a large amount of curing agent material from the tread to the backing must be prevented, and is prevented by the inclusion of a retardant.

As examples of tougheners suitable for use in the backing layer, I have found that ⅛ lb. of lime, 1 lb. of zinc oxide and 2 lbs. of magnesia to the 100 lbs. of rubber is satisfactory, although there are many well known materials that can be used alone or in combination with approximately the same results.

Examples of retardant incorporated either in the strip or strips, or applied as a surface film to one or both of the contacting surfaces of the backing and tread stocks have previously been given in my description and either a small amount of sulphur or a small amount of an accelerator, or a combination of sulphur and accelerator can be used to produce a very slight semi-cure effect either alone or in combination with the toughening materials described. In all instances when using either sulphur or an accelerator in the backing stock, I preferably use also about 1 lb. of oxide of zinc to the 100 lbs. of rubber for the purpose of so activating the curing agents so that the sulphur will be used up to a sufficient extent to prevent it subsequently oxidizing out on the surface in the form of bloom.

Another retardant is a rubber cement that has no curing agent or carrier therein, thereby distinguishing from and being in direct opposition to the previous use of a rubber cement including a curing agent and/or carrier.

To further increase the retardant action, there may be added to the rubber cement, also in contradistinction to the previous use of such cement, other retardants such as boracic acid and those previously mentioned.

The invention claimed is:—

1. A composite rubber sheet including a vulcanized tread layer including a vulcanizing material therein and a relatively raw backing layer secured together by heat and pressure, a retardant material preventing substantial migration of the vulcanizing material into the backing layer when subject to heat and pressure, and a toughening material for the second mentioned layer, said toughening material having a carrier action relative to the vulcanizing material.

2. A composite rubber sheet including a vulcanized tread layer including a vulcanizing material therein and a relatively raw backing layer secured together by heat and pressure, a retardant film between the layers preventing substantial migration of the vulcanizing material into the backing layer when subject to heat and pressure, and a toughening material for the second mentioned layer, said toughening material having a carrier action relative to the vulcanizing material.

3. A composite rubber sheet suitable for shoe sole replacement or repair purposes including a relatively cured or vulcanized tread layer, a relatively non-vulcanized layer toughened beyond the tearing strain of natural raw rubber and united to the tread layer by heat and pressure sufficiently to secure a vulcanization adjacent the tread layer in the other layer to inseparably and homogeneously secure them together such that the connection is sufficient to withstand separation under flexing strains of normal use, said second mentioned layer upon its opposite face having a relatively uncured, tacky, non-blooming surface readily combinable with rubber cement for homogeneous connection to a supporting surface by rubber cement such that the connection is sufficient to withstand separation under flexing strains of normal use.

4. A composite sheet in the form of a shoe sole and the like, adapted for cementitious union to a shoe for replacement and repair purposes including a vulcanized tread layer having vulcanizing material therein, a relatively raw rubber backing layer united thereto by heat and pressure and having toughening material therein which toughening material inherently normally constitutes a carrier or transmitting medium of the vulcanizing material, said relatively raw layer including a tacky face opposite the tread portion for cementitious union to the shoe, the amount of toughening material in the relatively raw rubber layer being at least sufficient to toughen the same so that the tearing strength in the raw rubber layer is at least as great as the cement union, and a retardant material preventing substantial migration of the vulcanizing material from the tread layer to the backing layer and accelerated transmission thereof into and through the relatively raw rubber layer, whereby the relatively raw rubber layer has the desired inherent strength and the desired tacky surface.

5. A sheet as defined by claim 4, characterized by the retardant material being interposed between the two layers.

6. A composite sheet to form a shoe sole, comprising a tread layer of vulcanized rubber, a backing layer formed of semi-cured toughened rubber of tacky consistency, and a film of retardant material such as pure raw rubber interposed between and united with said tread and backing layers.

ALBERT L. MURRAY.